United States Patent [19]

Bury

[11] 4,094,786
[45] June 13, 1978

[54] TREATMENT CONTROL APPARATUS FOR WATER SYSTEMS

[76] Inventor: John R. Bury, 620 Hidden Valley, Kitchener, Canada

[21] Appl. No.: 840,981

[22] Filed: Oct. 11, 1977

[51] Int. Cl.² .............................................. C02B 1/18
[52] U.S. Cl. ................................... 210/101; 210/128; 210/136; 210/138; 210/206
[58] Field of Search ............... 210/101, 104, 128, 139, 210/206, 138, 136

[56] References Cited

U.S. PATENT DOCUMENTS

| 3,274,094 | 9/1966 | Klein | 210/101 X |
| 3,522,881 | 8/1970 | Nicol | 210/139 X |
| 3,721,344 | 3/1973 | Rost | 210/104 |
| 3,928,197 | 12/1975 | Horan et al. | 210/101 X |
| 3,957,637 | 5/1976 | Morey | 210/138 X |

Primary Examiner—John Adee
Attorney, Agent, or Firm—Kerry Maxwell Hill

[57] ABSTRACT

The disclosed control apparatus for water treatment systems embodies a float switch actuably responsive to a predetermined drop in stored water level causing the pumping of treatment solution to a predetermined rate of flow controlled by a flow orifice for a predetermined period of time when called for by a thus energized clock totalizer embodying cam mechanism therein and a sensitive switch responsive thereto for controlling the flow of treatment solution to the water reservoir proportional to the delivery of make up water controlled by the float switch.

4 Claims, 7 Drawing Figures

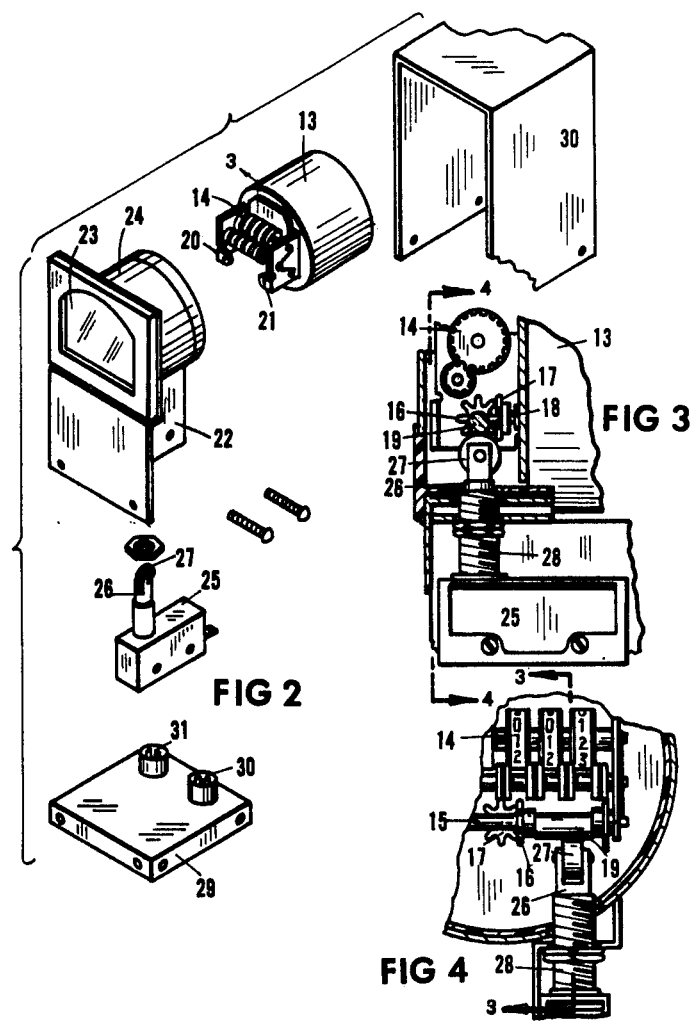

TREATMENT CONTROL APPARATUS FOR WATER SYSTEMS

BACKGROUND OF THE INVENTION

The invention concerns a control apparatus for liquid water treatment systems.

Field of the Invention

Liquid or solution feeders for water treatment are commonly provided by a device such as a float valve adapted to mechanical valve action to control the head on a flow determined orifice. Variations of treatment feed or flow can be obtained by changing the head, i.e. adjusting the operating level of the float feed valves or changing the orifice to a different size by a selectable flow path through different orifices controlled by a manual valve. In water treatment it is usual to mix the treating chemicals in the solution and then to meter the solution to the water to be treated. Present requirements of the control of commercial treatment of waters to render them potable requires controlled additions of treatment chemicals to be accurate within ranges of less than one part per million of water treated. Generally, prior art devices relying upon mechanical valving controlled by a float device or the electrical control of the duration of injection of feed treatment water responsive to water level alone does not permit the order of accuracy required in present-day water treatment problems on a satisfactory basis of reliable consistancy.

The art in recent years is replete with references dealing with the accurate metering of a treatment solution such as by utilizing a timer relative to a standard orifice and a predetermined pressure to cause a predetermined amount of treatment solution to be delivered to a water reservoir. All that is accomplished by such accurate metering of a treatment solution is the accurate measurement of the treatment solution and not the accurate measurement of the treatment of the water in the reservoir by the solution. It is at this precise point that the invention diverges markedly from the prior art and causes the amount of treatment solution to be controlled directly by the amount of make up water as the make up water is added thereby eliminating the prior art step of determining from the reservoir the amount of treatment required and then adding an accurate corrective amount of treatment solution.

It is accordingly an object of the invention to provide a system for injecting treating solutions into a water reservoir in which the system is first activated responsive to the water level at some point such as in a water reservoir but thereafter a totalizer having actuating cams driven thereby and activated by a float detected drop in water level activates a valve releasing treating solution through a measured orifice for a predetermined period of time determined by said totalizer thus to provide a measured quantity of treating solution responsive only to a predetermined delivered quantity of make up water totalized by said totalizer, the totalizer being de-energized when the float switch cuts off delivery of make up water. Thus it achieves exact injection of treatment solution responsive to the delivery of make up water determined by said float switch.

SUMMARY OF THE INVENTION

The invention comprises a control apparatus for liquid water treatment systems having in combination a float sensitive switch responsive to the drop of water level in a water reservoir to a predetermined level; a small tank and housing therefor carrying said float and switch and means for connecting said small tank to a water reservoir whereby the water in said tank drops responsive to a drop in water level in said reservoir. Activation of float switch causes voltage to flow both to solenoid operated water valve and an electric motor actuated totalizer having a digital read out thereon embodies cam devices therein at least one of said cam devices being adapted to determine a predetermined time period during which a sensitive switch actuated thereby is held closed. Accordingly once said totalizer is actuated the same is adapted to continue in the energized condition for a predetermined period determined by the float switch and to totalize during such time period. The invention however permits the direct injection with a high degree of accuracy of those chemical solutions adapted to be added to a water reservoir in relatively high concentration in water solution in such manner that such treatment solution injection is proportional only to totalized make up water delivered to the reservoir.

BRIEF DESCRIPTION OF THE DRAWINGS

The invention is illustrated in its preferred mode in the accompanying drawings wherein;

FIG. 1b, is a view of the level control partly in section and taken along the line 1b—1b, of FIG. 1a.

FIG. 1c is a view of the float arm taken in the direction 1c—1c, of FIG. 1b.

FIG. 2 is an exploded view of a totalizer control.

FIG. 3 is an enlarged section of clock motor drive.

FIG. 4 is a section on line 4—4 of FIG. 3 and revealing an additional section line reference 3—3 for FIG. 3;

DETAILED DESCRIPTION OF THE DRAWINGS

Figure 1A:
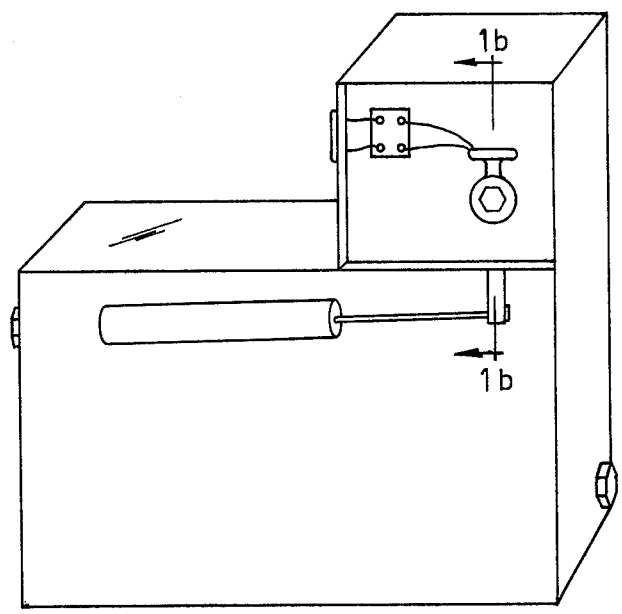
FIG. 1a, is a perspective view of the level control showing auxiliary reservoir and control mounted thereon.
Figures 1B, 1C:
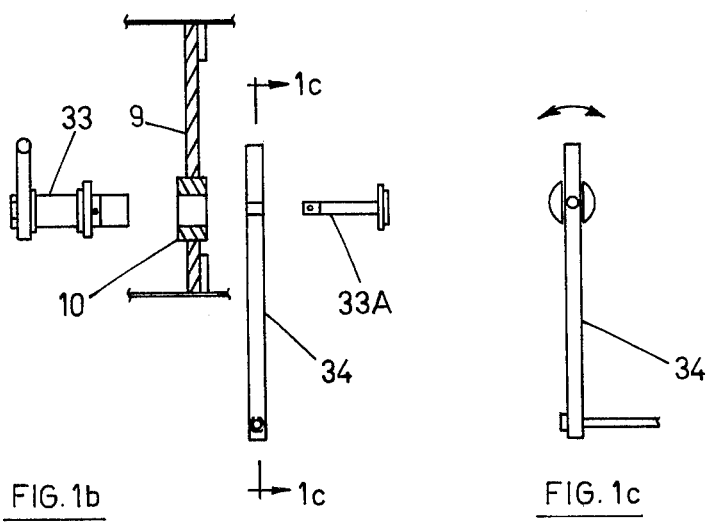
Figure 5:
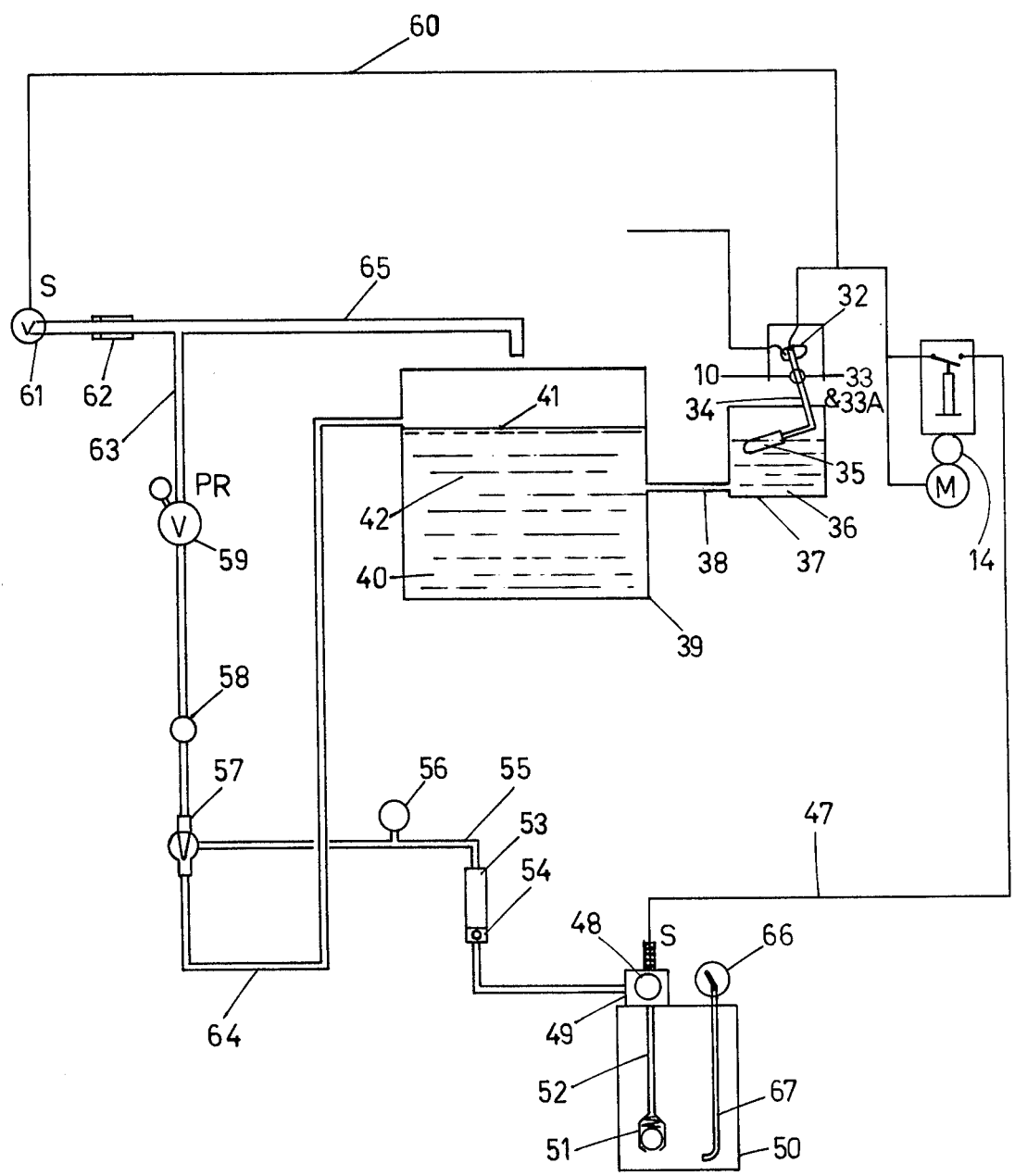
FIG. 5 is a simplified diagrammatic electrically controlled water solution flow diagram.

The totalizer switch device of the invention comprises a conventional electric clock motor drive unit 13 driving the digital display wheels 14 indicating elapsed units of time in hours and tenths of hours and convertible to gallons of make up water delivered. Such devices are well known and are generally available. According to the invention however, the digital mechanism drive shaft 15 having gear 16 driven by drive gear 17 extending from time shaft 18 of clock mechanism 13 carries one or more cams 19 therealong between the supports 20 and 21, the latter being fastened in a suitable frame 22 carrying viewing window 23 and timer case 24. Frame 22 supports normally open sensitive switch 25 actuable by the depressible plunger 26 having cam engaging wheel 27 thereon, plunger 26 being supported in mounting sleeve 28 by a compression spring not shown. Base 29 supports time mechanism housing 30 adapted to enclose clock motor mechanism 13, clock housing 24 and frame 22 with the switch 25. Electrical leads (not shown) connect from switch 25 to base socket terminals 30 and from the motor (not shown) of clock mechanism 13 to terminal 31 thence through base 29 exteriorly of the latter for connection in the manner to be described.

In FIG. five, 32 is a mercury switch mounted on shaft 33 to which the float arm 33A shaft is attached. Float 35 is attached to float arm 34. Float arm 34 is rotated freely on shaft 33A through pre-determined degrees of "lost motion" and thence conveys its rotary motion to shaft 33 to close mercury switch 32. Shaft 33 rotates within ball bearing 10 supported by support panel 9 attached to the enclosure housing. The choice of number of degrees of lost motion determines water level differential in reservoir 37 or conversely for whatever choice of water level differential desired a finite valve in degrees of lost motion is selected.

Float arm 34 is responsive to rotary motion when water 36 of reservoir 37 is connected to line 38 to main reservoir 39 when by a drop in level of water 40 in reservoir 39 from maximum level 41 to predetermined level 42 causes float arm 34 to rotate through its predetermined limits to close switch 32. Closure of switch 32 connects supply voltage of line 44 to line 60, water, solenoid, and totalizer motor line 43.

Line 45 connects line 44 to terminal 46 of clock cam switch 25. As clock drive motor 13 turns shaft 15 causing cam 19 to depress switch actuator plunger 26 to close switch 25. The shape of cam 19 and the speed of shaft 18 have a relationship of six revolutions to one revolution of digital shaft 14, that is of one tenth of an hour to one hour. Line 47 from switch 25 actuates normally closed solenoid valve 48 housed in enclosure 49 to permit treatment chemical to be raised from drum 50 through valve 51, containing a spring loaded ball biased in the downward direction through vacuum line 52. When solenoid 48 is open treatment passes through line 52 to flow control 53 which incorporates needle valve 54, the latter determining the flow rate in parts per million of the treatment relative to the make up water.

When solenoid 61 is opened inflowing water passes through flow control valve 62 where it divides: one line 65 to reservoir 40 and line 63 of reduced diameter coducts water through pressur reducing valve 59 which has its own pressure gauge attached. The purpose of the pressure reducing valve is to reduce the pressure in in line 63, 10 p.s.i. below main line pressure, to ensure that pressure in said line is constant. Having passed through line 59, water proceeds to flow control needle valve 58 and thence through venturi 57. At 57 the stream picks up treatment by Vacuum injection and conveys it to reservoir 40 through line 64. The function of valve 58 is to adjust the stream flow to provide the vacuum as recorded by gauge 56. A valve of 10 inches of vacuum is optimum. The setting of the needle valve causes the flow rate to be constant and the vacuum valve to be constant.

In order to provide an assessment of the accuracy of treatment delivery in parts per million a drum gauge is provided consisting of a sensitive pressure gauge 66 reading in inches of water to which is attached a weighted tube 67 whose open end is suject to the pressure developed at the bottom of the drum by the weight of the treatment solution. Considering a drum of constant dimension and a treatment solution whose specific gravity is known the gauge will record the number of pounds of treatment solution in the drum at any chosen time.

Relating the pounds of material which has left the drum with the digital reading of the totalizer a value in parts per million of treatment is provided for verification.

Typical operation with assigned values to typical components

Water: Supply at 60 psi plus or minus 10psi controlled by water solenoid at 50 psi minimum.

Flow: 10 U.S. gallons per minute or 5000 pounds of water per hour A water line conveying water directly to storage reservoir, and with a water line to vacuum system in which a pressure reducing valve is set at 40 psi to insure that pressur is a constant. This line incorporates needle valve flow control, the setting of which is dependent on a desired value of 10 inches of vacuum as monitored by gauge in the line. The value of vacuum becomes a constant once the settinf is made.

Treatment: The vacuum line incorporates the treatment supply drum containing treatment solution. Upon initiation of a treatment interval the treatment flows into the vacuum line through spring loaded ball foot valve through open solenoid valve to flow meter whose needle valve setting would be at 0.5 u.s.gallons of water per hour if the treatment desired were 100 parts per million.

Electrical: Initiated by a predetermined drp in level of storage reservoir water the level control mercury switch closes to cause current to flow to water solenoid and to the clock totalizer simultaneously whereby the intervals of time of flow is recorded by totalizer clock that is one hour represents 5000 pounds of water. A secondary electrical circuit is activated by a cam mechanism on a sensitive switch attached to the totalizer clock, determines the intervals of flow of treatment depending and coinciding with the dwell time of the cam. To achieve a delivery of 100 parts per million at treatment a dwell time of one minute would be selected. Due to the inherent properties of the totalizer clock an accumulated flow time of six minutes for each hour would be achieved (flow time being 0.1 for each hour of totalizer clock operation.

If the specific gravity of the tratment solution is 1.21 and the flow meter setting of flow is 0.5 u.s.gallons per hour the delivery of solution is as follows $0.5 \times 8.33$ (lbs.) $\times 0.1$(time) $\times 1.21$(specific gravity) $= 0.5$ pounds for 5000 pounds which is 100 parts per million. Within practical limits for whatever value of parts per million is desired a finite value of flow metre setting and dwell time can be chosen.

Example: A 0.1 value of flow meter setting and one half minute of dwell time would result in $0.1 \times 8.33 \times 0.05 \times 1.21 = 0.05$ pouds for 5000 pouds or 10 parts per million.

Having regard to the foregoing, it will be appreciated that the invention concerns a system for introducing an accurate quantity of treating solution into a water reservoir to which make-up water is added responsive to a predetermined drop in head, said water being added through a control orifice at a constant rate of flow, and comprising in combination: a tank in liquid communication with said reservoir, the liquid level in said tank corresponding to the liquid level in said reservoir; a normally open liquid level responsive first electrical switch closable upon a drop in liquid level in said tank corresponding to a predetermined drop in head in said reservoir; an exterior source of make-up water at a predetermined rate of flow both to said reservoir and to a line the pressure in which is controlled by a valve to insure a constant pressure and a needle valve to insure constant rate of flow, responsive to closure of said switch; a totalizer device including a clock type motor electrically actuated responsive to closure of said switch; totalizer mechanism associated with said motor and driven thereby, said mechanism defining totalizing cycles responsive to a predetermined time base determined by said motor and responsive to the volume of make-up water delivered to said reservoir through said control orifice; a second normally open electrical switch associated with said totalizing mechanism actuably closable thereby over a predetermined portion only of a cycle thereof; a treating solution container and line for delivering treating solution from said container to said reservoir; a second control orifice for said treating solution between solenoid valve and said reservoir; means for actuating said vacuum responsive to closure of said second switch; and means for maintaining such float switch closed until the water level in said reservoir rises to a predetermined level.

What is claimed is:

1. A system for introducing an accurate quantity of treating solution into a water reservoir to which make up water is added responsive to a predetermined drop in head, said water being added through a control orifice at a predetermined pressure at a constant rate of flow, and comprising in combination: a tank in liquid communication with said reservoir the liquid level in said tank corresponding to the liquid level in said reservoir; a normally open liquid level responsive first electrical switch closable upon a drop in liquid level in said tank corresponding to a predetermined drop in head in said reservoir; means for pumping make-up water at a predetermined rate of flow to said reservoir responsive to closure of said switch; a totalizer device including a clock type motor electrically actuated responsive to closure of said switch; totalizer mechanism associated with said motor and driven thereby, said mechanism defining totalizing cycles responsive to a predetermined time base determined by said motor and responsive to the volume of make-up water delivered to said reservoir through said control orifice; a second normally open electrical switch associated with said totalizing mechanism actuably closable thereby over a predetermined portion only of a cycle thereof; a treating solution container and a second electrically actuated pump of constant pressure characteristic for delivering treating solution from said container to said reservoir; a second control orifice for said treating solution between said second pump and said reservoir; means for actuating said second pump responsive to closure of said second switch; and means for maintaining such float switch closed until the water level in said reservoir rises to a predetermined level.

2. The system of claim 1 and a check valve device associated with said second pump for maintaining the priming thereof.

3. The system of claim 1 in which said first switch is of the mercury switch type.

4. The system of claim 1 in which the liquid level responsive first electrical switch comprises a mercury switch, a float arm for tilting said switch and a lost motion mechanism between said float device and said switch for maintaining closure of said switch once actuated by a predetermined drop in liquid level until the water level rises to a predetermined head in said tank.

* * * * *